M. FEDER.
BAKING OVEN.
APPLICATION FILED JAN. 22, 1919.
1,303,276.
Patented May 13, 1919.
3 SHEETS—SHEET 1.
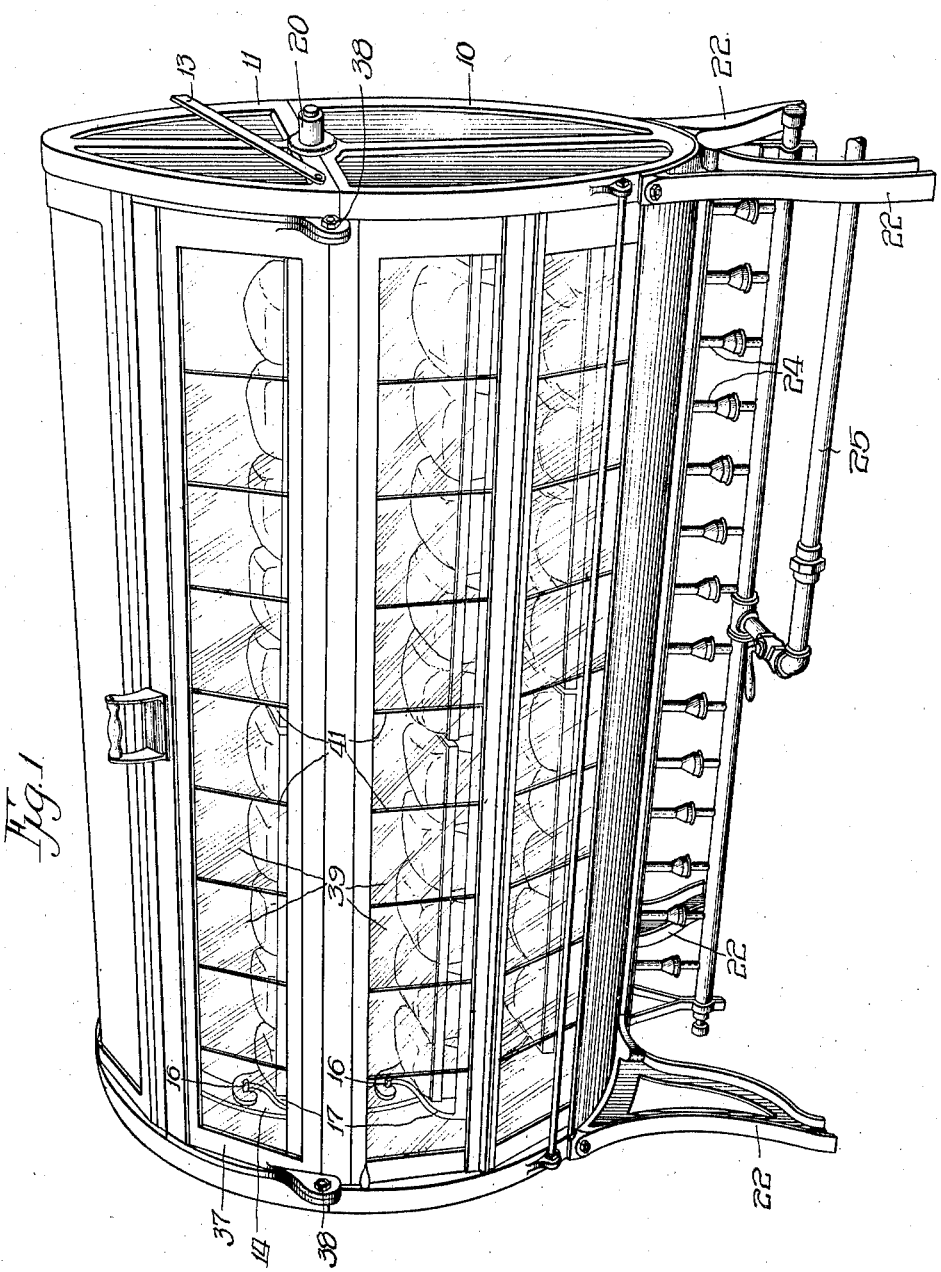
Witnesses:
R. Burkhardt
Chas. L. Byron
Inventor
Milton Feder:
By Wilkinson & Huxley
Attys.

M. FEDER.
BAKING OVEN.
APPLICATION FILED JAN. 22, 1919.
1,303,276.
Patented May 13, 1919.
3 SHEETS—SHEET 2.
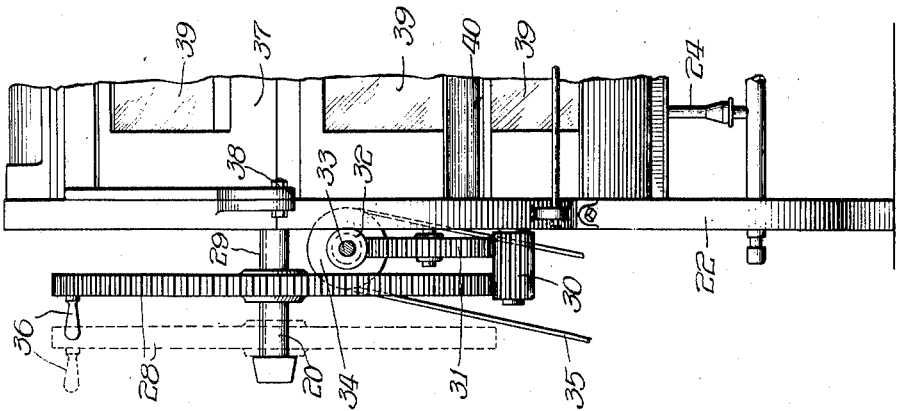
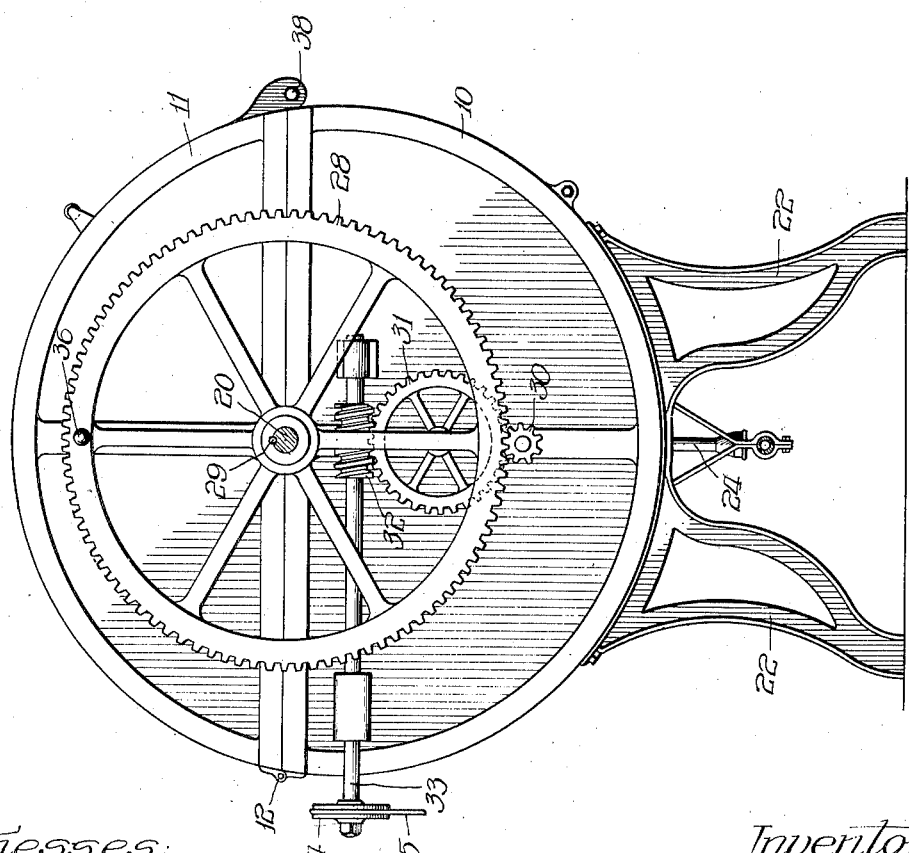
Witnesses:
R. Burkhardt.
Chas. L. Byron.
Inventor:
Milton Feder.
By Wilkinson & Huxley
Attys.

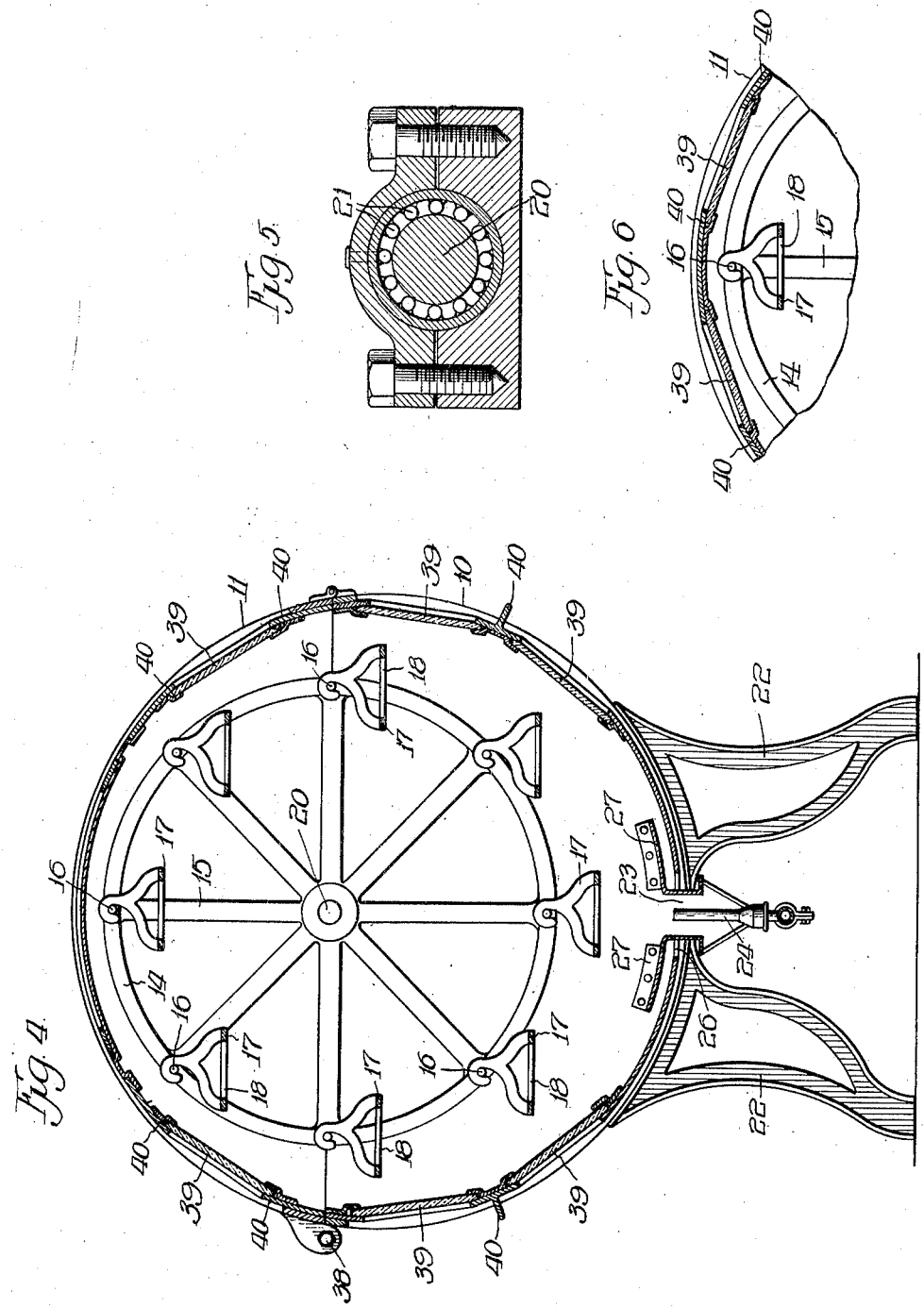

UNITED STATES PATENT OFFICE.

MILTON FEDER, OF CHICAGO, ILLINOIS.

BAKING-OVEN.

1,303,276.     Specification of Letters Patent.     Patented May 13, 1919.

Application filed January 22, 1919. Serial No. 272,445.

*To all whom it may concern:*

Be it known that I, MILTON FEDER, a citizen of the United States, residing at Chicago, in the county of Cook and State of Illinois, have invented certain new and useful Improvements in Baking-Ovens, of which the following is a specification.

This invention relates to a bakery oven, of the rotary type such as described and claimed in my application Serial No. 244,087, filed July 9, 1918.

In the use of bakery ovens heretofore produced, the best possible results have not been accomplished due primarily to the construction of the ovens and to the lack of knowledge of proper heating conditions which should prevail within the ovens. Bread baked in the old types of ovens, including the rotary type, has not been of the best quality for the reasons that the crust was not properly formed, fermentation was not checked at the proper time, the moisture from the dough escaped in excess, the grain or texture of the bread was relatively poor, and the crust was not uniform, parts being burned and other parts not being browned.

Therefore, one of the objects is to make possible the proper baking of bread to overcome the objectionable features hereinabove mentioned.

Another object is to provide a simple, compact, durable, and efficient bakery oven embodying novel features, by means of which better bread can be made at a lower cost.

These and other objects are accomplished by means of the oven shown on the accompanying sheets of drawings, in which—

Figure 1 is a perspective view of my improved bakery oven;

Fig. 2 is an end view of the same oven;

Fig. 3 is a fragmentary side elevation of the same oven;

Fig. 4 is a vertical transverse sectional view intermediate the ends of the oven;

Fig. 5 is a detail sectional view showing the bearing and shaft arrangement; and Fig. 6 is a fragmentary sectional view of a modification of the closure of my oven.

The various novel features of my invention will be apparent from the following description and drawings, and will be particularly pointed out in the appended claims.

Referring to the figures of the drawings, it will be noted that my oven includes a closure having complementary lower and upper members 10 and 11, respectively, which together form a cylindrical oven, the upper portion 11 of the oven closure being pivoted at 12 to the lower portion 10 whereby the upper portion 10 may be swung into an open position, in which position it may be supported by pivotally mounted supporting members 13, only one of which is shown. Rotatably mounted within the closure is a reel 14, including a plurality of circular spider members 15 provided with projections 16, by means of which a plurality of longitudinally extending shelves 17 may be pivotally suspended, said shelves 17 being circumferentially spaced, preferably at regular intervals. Preferably the floor of the shelves 17 are provided with openings 18 to permit heat to have uninterrupted access to the bottom of the baking pans 19 which are placed upon the shelves. The reel 14 is mounted upon a shaft 20 supported by the lower closure member 10, and is provided with anti-friction bearings 21 for the purpose of preventing vibration of the reel and falling of the bread which takes place in some ovens when the oil is dried or becomes caked in the bearings as a result of the heat. One end of the shaft 20 is provided with a gear 28 which is keyed to the shaft by a spline 29. Meshing with this gear 28 is a suitably supported intermediate gear 30, with which also meshes a worm gear 31 driven by a worm 32 on a suitably supported shaft 33. Mounted upon this shaft is a pulley 34, around which passes a belt 35 which may be driven from any suitable source. By means of this gearing arrangement the reel may be rotated at the desired speed, which preferably is relatively slow. If for any reason it is desired to rotate the reel by hand, the same may be done by shifting the gear 28 laterally on the shaft to a position shown in dotted lines in Fig. 3, whereupon the reel may be operated manually directly by means of the handle 36.

The closure is suitably supported upon spaced legs 22. The bottom of the lower closure member 10 is provided with a longitudinally extending opening 23 through which any suitable heat generating means, such as lamps or burners 24, may extend, the burners 24 receiving their supply of fuel from a supply pipe 25. The heat produced by the flame at the end of the burners 24 is the heat used for baking bread. Some of the unconsumed gas after becoming cooled escapes in a downward movement through openings 26 formed between baffle plates 27 and the lower closure member 10. The upper closure member 11 includes a door 37, which is pivoted at 38, whereby the reel may be loaded with pans of dough and the reel unloaded of its pans of baked bread.

Heretofore it has been the practice to make the closure entirely of metal with the exception that a relatively small peek-hole was provided whereby the condition of the bread could be observed. It has been found by experience that such a metal structure is not entirely satisfactory, and, as a matter of fact, is detrimental in the baking of bread, in that the heat within the metal closure acts in a manner to cause the dough placed within the oven to continue its rising action, which is the result of a greatly increased action of fermentation. At the same time the heat in such metallic oven causes an excess amount of moisture to be extracted from the dough, resulting in a bread drier than is consistent with good baking. After a careful study of the problem and careful experimentation, I have established the fact that a much better bread can be produced by forming the closure principally or substantially wholly of glass.

By referring to the drawings it will be noted that panes of glass 39 are suitably supported in the metallic frame members 40 of the closure members 10 and 11. In Figs. 1, 3, and 4 I have shown the closure provided with glass substantially throughout the entire cylindrical surface, with the exception of the extreme bottom and extreme top of the closure. These portions are made of metal, largely for the purpose of making the closure members 10 and 11 more rigid. As shown in Fig. 6, however, it will be noted that the entire upper closure member 11 is provided with glass with the exception of the supporting frame members 40. The glass does not radiate heat so rapidly as metal, and especially metals used for constructing ovens. On the other hand, glass has great heat reflective power. Accordingly, heat passed into the closure composed largely of glass does not escape as a result of radiation, but, on the other hand, is maintained within the closure as a result of the reflective action of the glass. As a result of the heat reflective action of the glass, dough which is placed within the closure on the reel in a relatively short time is provided with a relatively heavy crust whereby the moisture of the dough is retained in the loaf and at the same time fermentation checked almost immeditaely. In baking bread in my new oven, the bread is provided with a closer grain and a finer texture than it has been possible to obtain heretofore. At the same time the color of the crust is uniform throughout. Heretofore if sufficient heat was present in the metal type of oven to form a heavy crust on the upper part of the loaf, the bottom of the loaf was burned. However, such is not the case in making bread in my oven, for the reason that the upper part of the loaf receives as much heat as the lower part as the result of the action of the glass in reflecting the heat. Of course, it will be understood that common glass cannot be used for this purpose, because such glass would break. A specially prepared glass is used which can withstand heat and at the same time perform the functions hereinabove mentioned.

It will be noted that the panes of glass 39 are slightly spaced to present relatively small cracks 41 for permitting the escape of the relatively small amount of moisture or steam that escapes from the loaves. In this way the oven is free from any excess moisture. This assists materially in the rapid formation of the crust. These small spaces between the panes of glass also permit the escape of any gas which does not escape through the openings 26.

Not only does the closure principally formed of glass make possible better baking of bread, but at the same time makes ready inspection of the baking bread possible by a large number of people. This sanitary and compact oven may be placed in any show window for inspection by the public without any disadvantages as a result of excess heating action, this being especially true in view of the fact that the glass makes possible the reflection of most of the heat, and, as a matter of fact, these ovens are used largely in front windows of bakeries.

It is my intention to cover all modifications of the invention falling within the spirit and scope of the following claims.

I claim:

1. A bakery oven including a cylindrical oven closure formed substantially wholly of glass whereby heat within the closure will be retained as a result of reflective action of the glass for forming the baked article with a heavy crust and a relatively moist interior, said oven containing means for supporting articles to be baked, in heat absorbing relation to the cylindrical walls of the oven.

2. A bakery oven including an oven closure cylindrical in shape for the reception of a rotary reel and formed substantially wholly of glass whereby heat within the closure will be retained as a result of reflective action of the glass for forming the baked article with a heavy crust and a relatively moist interior.

3. A bakery oven including an oven closure comprising upper and lower relatively movable parts whereby the interior may be completely exposed, the upper of said parts being formed substantially wholly of glass whereby heat within the closure will be retained as a result of reflective action of the glass for forming the baked article with a heavy crust and a relatively moist interior, said oven containing means for supporting the articles to be baked, in heat absorbing relation to the walls of the oven.

4. A bakery oven including a cylindrical oven closure comprising two complementary parts, one pivotally connected to the other, said parts adapted to receive a rotatably mounted reel and formed principally of glass whereby heat within the closure will be retained as a result of reflective action of the glass for forming the baked article with a heavy crust and a relatively moist interior.

5. A bakery oven including an oven closure formed principally of glass whereby heat within the closure will be retained as a result of reflective action of the glass for forming the baked article with a heavy crust and a relatively moist interior, the glass being arranged in panes spaced apart for forming relatively small openings for the escape of moisture and gas.

6. A bakery oven comprising an oven closure including upper and lower pivotally connected complementary members, the upper one of which forms part of a cylinder and includes a pivotally mounted door whereby material may be placed within and withdrawn from the closure, said upper closure member being formed substantially wholly of glass for retaining heat within the closure as a result of the reflective action of the glass, and said oven containing means for supporting the articles to be baked, in heat absorbing relation to the glass walls of the upper closure member.

7. A bakery oven including an oven closure formed principally of glass whereby heat within the closure will be retained as a result of the reflective action of the glass, the closure in one part having an opening for the escape of gas, the glass being in the form of a plurality of panes spaced apart slightly to present openings for the escape of moisture and any remaining gas.

8. A bakery oven comprising a cylindrical closure constructed substantially wholly of glass and thereby adapted to retain heat within the closure as a result of the low conductivity and reflective action of the cylindrical glass walls; and said closure having means for supporting articles to be baked in a series of positions distributed around within the cylindrical walls of the closure.

Signed at Chicago, Illinois, this 11th day of January, 1919.

MILTON FEDER.